US011618296B2

(12) United States Patent
Smith

(10) Patent No.: US 11,618,296 B2
(45) Date of Patent: Apr. 4, 2023

(54) SHOCK STIFFENER SYSTEM

(71) Applicant: Justin Smith, Wittmann, AZ (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 113 days.

(21) Appl. No.: 17/155,310

(22) Filed: Jan. 22, 2021

(65) Prior Publication Data

US 2021/0221192 A1 Jul. 22, 2021

Related U.S. Application Data

(60) Provisional application No. 62/964,618, filed on Jan. 22, 2020.

(51) Int. Cl.
*B60G 17/08* (2006.01)
*B60G 13/08* (2006.01)

(52) U.S. Cl.
CPC .............. *B60G 17/08* (2013.01); *B60G 13/08* (2013.01); *B60G 2202/24* (2013.01); *B60G 2206/41* (2013.01); *B60G 2500/11* (2013.01); *B60G 2600/206* (2013.01); *B60G 2600/73* (2013.01); *B60G 2800/162* (2013.01)

(58) Field of Classification Search
CPC ............... B60G 13/08; B60G 2202/24; B60G 2206/41; B60G 2500/11; B60G 2600/206; B60G 2600/73; B60G 2800/162; F16F 9/16; F16F 9/463
See application file for complete search history.

(56) References Cited

U.S. PATENT DOCUMENTS

| | | | | |
|---|---|---|---|---|
| 10,556,477 | B2 * | 2/2020 | Marking | F16F 9/446 |
| 2012/0018263 | A1 * | 1/2012 | Marking | B60G 13/08 188/266.2 |
| 2013/0328277 | A1 * | 12/2013 | Ryan | B60G 17/0165 280/5.519 |
| 2015/0081171 | A1 * | 3/2015 | Ericksen | B60G 17/018 701/37 |
| 2018/0328445 | A1 * | 11/2018 | Gilbert | B60G 17/016 |
| 2020/0269647 | A1 * | 8/2020 | Strickland | F16F 9/325 |
| 2021/0108696 | A1 * | 4/2021 | Randall | F16F 9/50 |
| 2021/0179226 | A1 * | 6/2021 | Santurbane | B62K 25/02 |
| 2021/0268860 | A1 * | 9/2021 | Randall | F16F 9/56 |
| 2021/0276385 | A1 * | 9/2021 | Smith | B60G 15/065 |
| 2022/0163088 | A1 * | 5/2022 | Gagnon | F16F 9/464 |

FOREIGN PATENT DOCUMENTS

EP 3290738 A1 * 3/2018 ............. B60G 13/06
JP 2008008390 A * 1/2008

* cited by examiner

*Primary Examiner* — James A English
*Assistant Examiner* — Scott F. Underwood
(74) *Attorney, Agent, or Firm* — Schmeiser, Olsen & Watts LLP

(57) ABSTRACT

Provided is an on-demand shock stiffening system. The on-demand shock stiffening system operates to immediately stiffen the shocks in response to a user activating the system. The system may include a main body with an oil flow aperture and a flow control system that operates to restrict the flow of oil between the reservoir and the shock. The on-demand shock stiffening system may be coupled between the reservoir and the bridge of the shock and operates to restrict flow of the oil in order to stiffen the shock immediately in an on-demand manner.

12 Claims, 3 Drawing Sheets

SHOCK STIFFENER SYSTEM

CROSS REFERENCE TO RELATED APPLICATION

This application claims priority to U.S. Provisional Patent Application to Justin Smith entitled "SHOCK STIFFENER SYSTEM," Ser. No. 62/964,618, filed Jan. 22, 2020, the disclosures of which are hereby incorporated entirely herein by reference.

BACKGROUND OF THE INVENTION

Technical Field

This invention relates generally to shocks for a vehicle and more particularly to an on-demand shock stiffener system for immediately stiffening a shock.

State of the Art

The use of UTVs are common, and often the desire of drivers and passengers of a UTV is for the shocks to operate in a soft condition. This allows the UTV to engage bumps and rough areas of road and paths driven with reduced jarring or vibration for the passengers. However, there are moments during the operation of the UTV where the shocks need to be stiff, such as after a jump or a sharp drop or other obstacle where the UTV may bottom out. There are not aftermarket systems that exist to allow an on-demand stiffening of the shocks.

SUMMARY OF THE INVENTION

The present invention relates to an on-demand shock stiffening system. The on-demand shock stiffening system operates to immediately stiffen the shocks in response to a user activating the system.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to an on-demand shock stiffening system. The on-demand shock stiffening system operates to immediately stiffen the shocks in response to a user activating the system.

Figure 1:
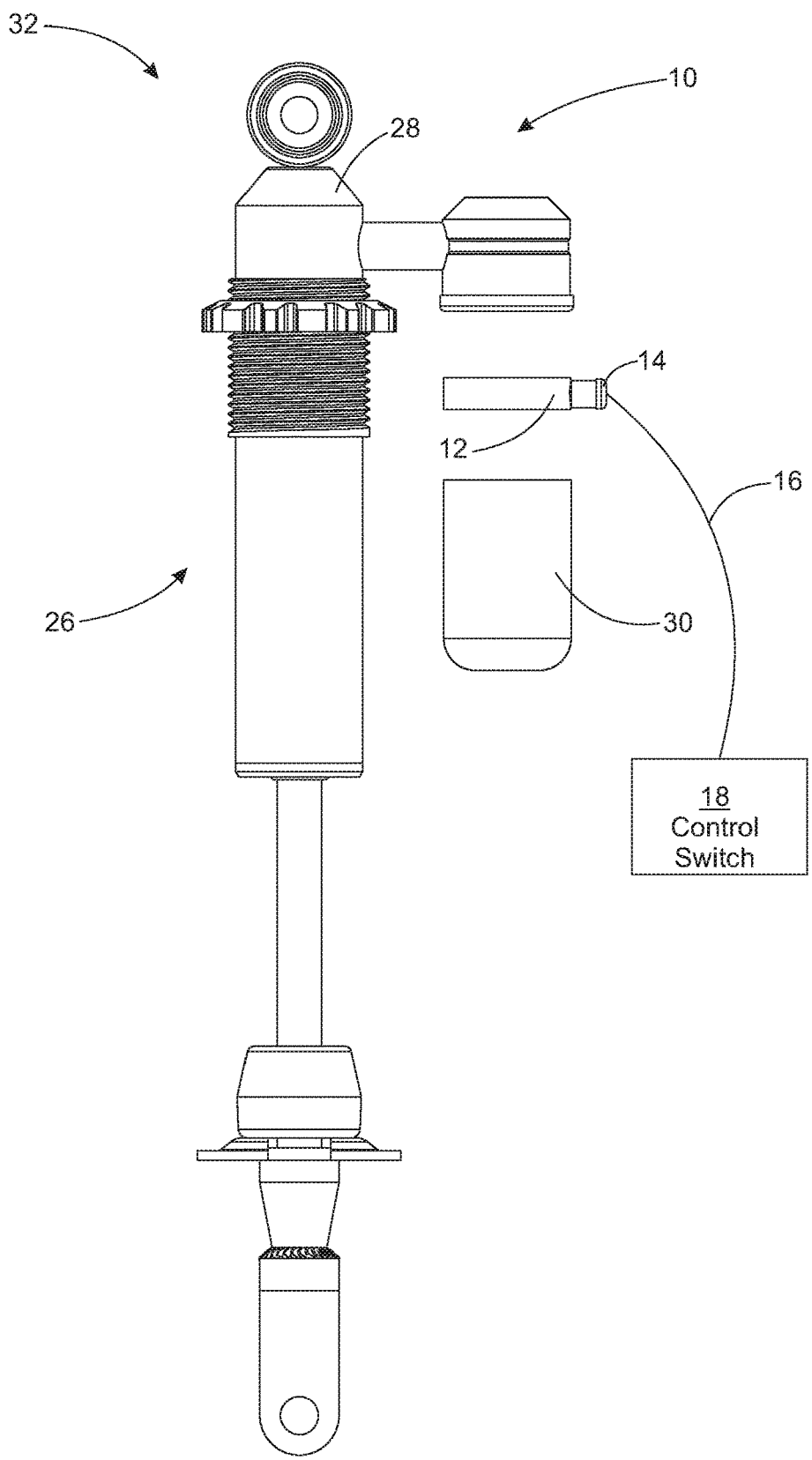
FIG. 1 is a partially-exploded perspective view of a shock stiffening system in accordance with an embodiment.

As shown in FIG. 1, the on-demand shock stiffening system 10 may be coupled to a hydraulic shock system 32 of a vehicle. The hydraulic shock system 32 may typically include a shock 26, a bridge 28 coupled to the shock 26, and an oil reservoir 30, wherein the oil reservoir 30 is coupled to the bridge 28 in order to supply oil to the shock 20. A main body 12 of the shock stiffening system 10 is coupled between the oil reservoir 30 and the bridge 28. The system 10 may be coupled to any hydraulic shock system and operate to stiffen any shock of the hydraulic shock system in an on-demand manner.

Figure 2A:
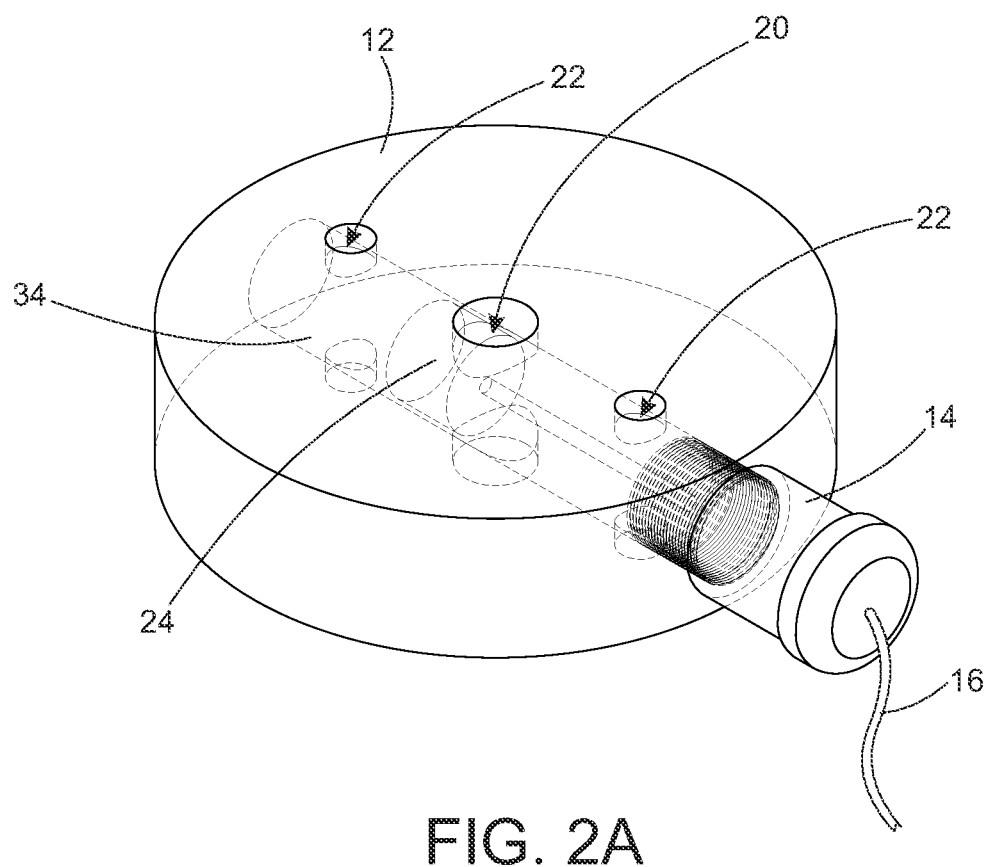
FIG. 2A is a perspective view of a flow control system of a shock stiffening system in accordance with an embodiment.
Figure 2B:
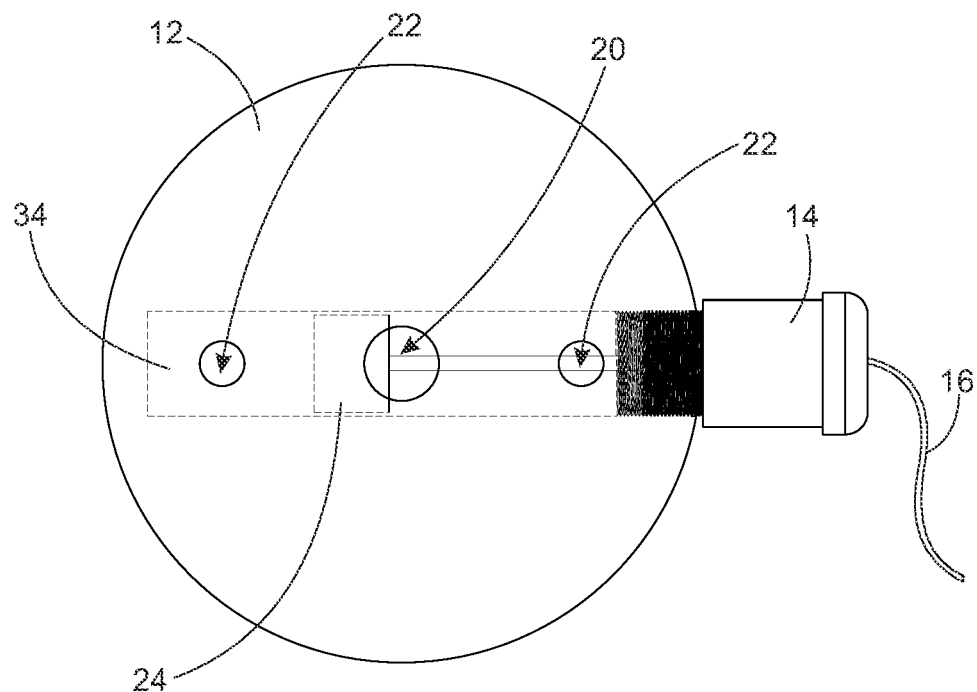
FIG. 2B is a top view of a flow control system of a shock stiffening system in accordance with the embodiment of FIG. 2A.

As shown in FIGS. 2A and 2B, the shock stiffening system 10 may include a main body 12 having an oil flow aperture 20 extending through the main body 12. Additionally, there are bypass apertures 22 that extend through the main body 12. The system 10 may include a flow control system that operates to stop the flow of oil through the oil flow aperture 20. In one embodiment, the flow control system includes a solenoid 14 coupled to a plunger 24. The plunger 24 is slidably coupled within a plunger channel 34 of the main body 12. The solenoid 14 is coupled to a control switch 18, which may be coupled to the vehicle within the driver compartment, by a coupler 16, which may be a wired coupler or a wireless coupler. The solenoid 14 is electric and is operable by operation of the control switch 18 that supplies power to the solenoid 14. The control switch 18 may be, without limitation, a push button. Activation of the solenoid 14 moves the plunger 24, within the plunger channel 34, to an engaged position that blocks flow of the oil between the reservoir 30 and the shock 26 through the bridge 28. The restriction of flow of oil through the oil flow aperture 20 prevents the shock 26 from compressing and keeps the shock 26 stiff or rigid.

With the restriction of flow of oil through the oil flow aperture by the plunger 24 being in the engaged position, pressure build up in the system can be an issue. The bypass oil apertures 22 are provided to allow oil to flow through the bypass apertures 22 in the event that the pressure of the oil reaches a predetermined level that requires flow through the bypass apertures 22. Deactivating the control switch 18 deactivates the solenoid 14 and the plunger 24 is moved to a disengaged position not blocking the oil flow aperture 20.

Figure 3:
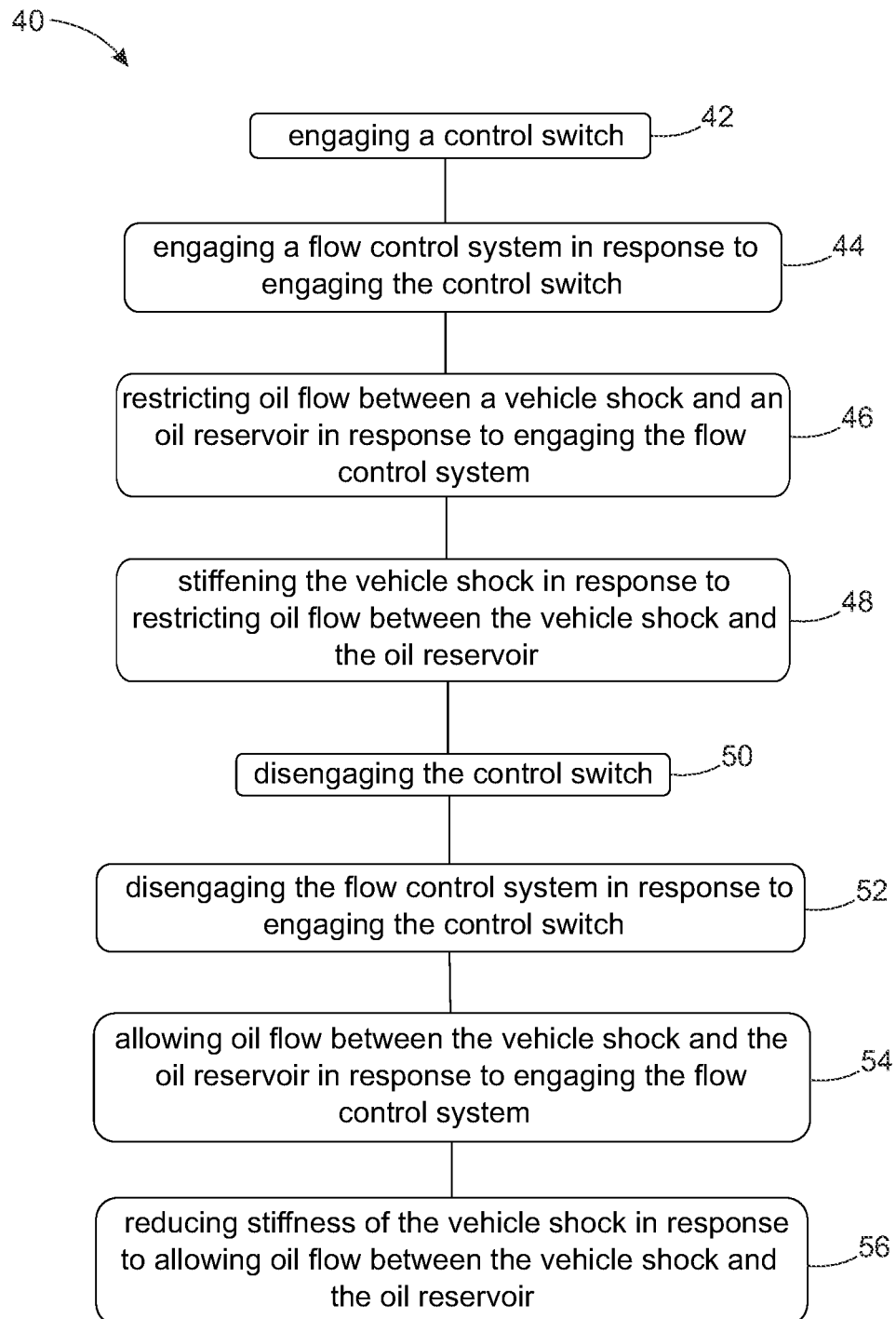
FIG. 3 is a block diagram of steps of a method of use of a shock stiffening system in accordance with an embodiment.

FIG. 3 is a block diagram of steps of a method 40 of using the on-demand shock stiffening system 10, which may include two subroutines of engaging flow restriction and disengaging flow restriction. The method 40 for engaging flow restriction may include engaging a control switch [Step 42]; engaging a flow control system in response to engaging the control switch [Step 44]; restricting oil flow between a vehicle shock and an oil reservoir in response to engaging the flow control system [Step 46]; and stiffening the vehicle shock in response to restricting oil flow between the vehicle shock and the oil reservoir [Step 48]

The method 40 for disengaging flow restriction may include disengaging the control switch [Step 50]; disengaging the flow control system in response to engaging the control switch [Step 52]; allowing oil flow between the vehicle shock and the oil reservoir in response to engaging the flow control system [Step 54]; and reducing stiffness of the vehicle shock in response to allowing oil flow between the vehicle shock and the oil reservoir [Step 56].

While the flow control system is depicted as a solenoid 14 with a plunger 24, it will be understood that any type of flow control system may be utilized so long as the system restricts flow of oil between the reservoir 30 and the shock 26 in response to operating the control switch 18.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A shock stiffening system, comprising:
 a main body configured to be coupled between a shock and an oil reservoir of a hydraulic shock system of a vehicle;
 a flow control system coupled to or integral to the main body and changeable between an engaged position, in which oil flow between the shock and the oil reservoir is restricted, and a disengaged position, in which oil flow between the shock and the oil reservoir is unrestricted;
 a control switch configured to be coupled to the vehicle within a driver compartment of the vehicle; and
 a coupling coupled between the control switch and the flow control system to establish communication between the control switch and the flow control system, wherein the flow control system changes between the engaged position and the disengaged position in response to operation of the control switch; wherein the flow control system comprises:
 at least one oil flow aperture through the main body, the at least one oil flow aperture being in fluid communication with the shock and the oil reservoir;
 a channel through the main body; and
 a plunger slidingly coupled within the channel, wherein the plunger is changeable from an engaged position, in which the plunger is positioned to block the oil flow aperture so as to restrict oil flow through the oil flow aperture, and a disengaged position, in which the plunger is positioned away from the oil flow aperture so as to allow unrestricted oil flow through the oil flow aperture, wherein the plunger is aligned transversely with respect to the oil reservoir, and wherein the plunger is between at least two bypass apertures through the main body in a horizontal direction.

2. The shock stiffening system of claim 1, wherein the flow control system further comprises:
 a solenoid coupled between the plunger and the coupling, wherein the plunger is changed between the engaged position and the disengaged position in response to engagement and disengagement of the solenoid in response to operation of the control switch.

3. The shock stiffening system of claim 2, wherein the at least two bypass apertures are in fluid communication with the shock and the oil reservoir, wherein oil flows through the at least one bypass aperture in response to a predetermined minimum oil pressure differential between a bridge and the oil reservoir.

4. The shock stiffening system of claim 3, further comprising the bridge coupled between the shock and the main body, the bridge being in fluid communication with the shock and the main body.

5. A shock stiffening system, comprising:
 a vehicle shock;
 a main body coupled to the shock;
 an oil reservoir coupled to the main body;
 a flow control system being coupled to or integral to the main body, the flow control system being changeable between an engaged position, in which oil flow between the shock and the oil reservoir is restricted, and a disengaged position, in which oil flow between the shock and the oil reservoir is unrestricted; and
 a control switch coupled to the vehicle within a driver compartment of the vehicle; a coupling coupled between the control switch and the flow control system to establish communication between the control switch and the flow control system, wherein the flow control system restricting oil flow between the shock and the oil reservoir changes between the engaged position and the disengaged position in response to operation of the control switch, wherein the flow control system comprises:
 at least one oil flow aperture through the main body, the at least one oil flow aperture being in fluid communication with the shock and the oil reservoir;
 a plunger channel through the main body;
 a plunger slidingly coupled within the plunger channel, wherein the plunger is changeable from an engaged position, in which the plunger is positioned to block the oil flow aperture so as to restrict oil flow through the oil flow aperture, and a disengaged position, in which the plunger is positioned away from the oil flow aperture so as to allow unrestricted oil flow through the oil flow aperture, wherein the plunger is aligned transversely with respect to the oil reservoir, and wherein the plunger is between at least two bypass apertures through the main body in a horizontal direction.

6. The shock stiffening system of claim 5, wherein the flow control system further comprises:
 a solenoid coupled between the plunger and the coupling, wherein the plunger is changed between the engaged position and the disengaged position in response to engagement and disengagement of the solenoid in response to operation of the control switch.

7. The shock stiffening system of claim 6, the at least two bypass apertures are in fluid communication with a bridge and the oil reservoir, wherein oil flows through the at least one bypass aperture in response to a predetermined minimum oil pressure differential between the bridge and the oil reservoir.

8. The shock stiffening system of claim 7, wherein the bridge is coupled between the shock and the main body, the bridge being in fluid communication with the shock and the main body.

9. A method of using a shock stiffening system, comprising:
 engaging a control switch;
 engaging a flow control system in response to engaging the control switch;
 restricting oil flow between a vehicle shock and an oil reservoir in response to engaging the flow control system; and
 stiffening the vehicle shock in response to restricting oil flow between the vehicle shock and the oil reservoir, wherein the flow control system comprises:
 at least one oil flow aperture through the main body, the at least one oil flow aperture being in fluid communication with the shock and the oil reservoir;
 a plunger channel through the main body;

a plunger slidingly coupled within the plunger channel, wherein the plunger is changeable from an engaged position, in which the plunger is positioned to block the oil flow aperture so as to restrict oil flow through the oil flow aperture, and a disengaged position, in which the plunger is positioned away from the oil flow aperture so as to allow unrestricted oil flow through the oil flow aperture, wherein the plunger is aligned transversely with respect to the oil reservoir, and wherein the plunger is between at least two bypass apertures through the main body in a horizontal direction.

10. The method of claim 9, wherein engaging the flow control system comprises:

engaging a solenoid; and sliding the plunger, coupled to the solenoid, to an engaged position, in response to engaging the solenoid.

11. The method of claim 9, further comprising:

disengaging the control switch;

disengaging the flow control system in response to disengaging the control switch;

allowing oil flow between the vehicle shock and the oil reservoir in response to engaging the flow control system; and reducing stiffness of the vehicle shock in response to allowing oil flow between the vehicle shock and the oil reservoir.

12. The method of claim 11, wherein disengaging the flow control system comprises:

disengaging a solenoid; and sliding the plunger, coupled to the solenoid, to a disengaged position, in response to disengaging the solenoid.

* * * * *